(12) United States Patent
Wang et al.

(10) Patent No.: US 8,325,771 B2
(45) Date of Patent: Dec. 4, 2012

(54) CAVITY-DUMPED PULSED SOLID-STATE LASER WITH VARIABLE PULSE-DURATION

(75) Inventors: Gary Y. Wang, Fremont, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 366 days.

(21) Appl. No.: 12/813,341

(22) Filed: Jun. 10, 2010

(65) Prior Publication Data

US 2010/0246616 A1    Sep. 30, 2010

Related U.S. Application Data

(62) Division of application No. 12/252,812, filed on Oct. 16, 2008, now Pat. No. 7,760,772.

(51) Int. Cl.
*H01S 3/11* (2006.01)

(52) U.S. Cl. .......... 372/10; 372/17; 372/30; 372/92

(58) Field of Classification Search ............. 372/10, 372/17, 30
See application file for complete search history.

(56) References Cited

U.S. PATENT DOCUMENTS

| | | | |
|---|---|---|---|
| 6,198,069 B1 | 3/2001 | Hackel et al. | |
| 6,580,732 B1 * | 6/2003 | Guch et al. | 372/18 |
| 6,587,483 B2 | 7/2003 | Kittelmann et al. | |
| 2006/0171018 A1 * | 8/2006 | Galvanauskas et al. | 359/333 |
| 2007/0280305 A1 | 12/2007 | Zucker | |
| 2008/0031290 A1 * | 2/2008 | Hollemann et al. | 372/25 |

* cited by examiner

*Primary Examiner* — Dung Nguyen
(74) *Attorney, Agent, or Firm* — Morrison & Foerster LLP (57) ABSTRACT

In a cavity-dumped, repetitively-pulsed, solid-state laser cavity dumping is protracted over a predetermined time longer than a round-trip time of the resonator of the laser. The cavity dumping is effected by a Pockels cell optical switch. During a dumping period a voltage applied to the Pockels cell falls in a predetermined time. Varying the voltage fall-time varies the duration of pulses provided by the laser, independent of the pulse-repetition frequency.

14 Claims, 6 Drawing Sheets

CAVITY-DUMPED PULSED SOLID-STATE LASER WITH VARIABLE PULSE-DURATION

PRIORITY

This application is a divisional of U.S. patent application Ser. No. 12/252,812, filed Oct. 16, 2008, the complete disclosure of which is hereby incorporated by reference.

TECHNICAL FIELD OF THE INVENTION

The present invention relates in general to repetitively-pulsed solid-state lasers. The invention relates in particular to repetitively-pulsed solid-state lasers from which pulses are delivered by cavity-dumping.

DISCUSSION OF BACKGROUND ART

Pulsed solid state lasers are used extensively for material processing applications such as machining, drilling, and marking. Most commercially available, pulsed, solid-state lasers are operated by the well known technique of Q-switching. Q-switched pulsed lasers include a laser-resonator having a solid-state gain-element and selectively variable-loss device located therein. The laser-resonator is terminated at one end thereof by a mirror that is maximally reflecting at a fundamental wavelength of the gain-element, and terminated at an opposite end thereof by a mirror that is partially reflecting and partially transmitting at the fundamental wavelength. Such a laser is usually operated by continuously optically pumping the gain-element while periodically varying (switching) the loss caused by the variable loss device (Q-switch) between a value that will prevent lasing in the resonator and a value that will allow lasing in the resonator. While lasing is allowed in the resonator, laser radiation is delivered from the partially transmitting mirror as a laser pulse.

The pulse repetition frequency (PRF) of a Q-switched solid-state laser is determined by the frequency at which the Q-switch is switched. The pulse duration is determined for any particular gain-medium by factors including the transmission of the partially-transmitting mirror, any loss in the Q-switch in a lasing-allowed condition, the optical pump power, and the PRF. A pulse repetition rate and a pulse duration that are optimum for an operation on any one material will usually not be optimum for another operation or another material. Accordingly, an "ideal" pulsed laser would have independently variable PRF and pulse-duration to allow an optimum combination to be selected for most operations on most materials.

One type of pulsed solid-state laser in which the PRF can be varied without a variation in pulse duration is referred to by practitioners of the art as a cavity-dumped laser. In a cavity dumped-laser, a laser-resonator including a solid-state gain-element is terminated at each end thereof by a mirror that is maximally reflecting at a fundamental wavelength of the gain-element. Also included in the resonator is an optical switch, comprising a Pockels cell cooperative with a polarization-selective reflector (polarizing beamsplitter) and a quarter-wave plate. A Pockels cell includes a material, the birefringence of which can be switched by application of an electrical potential. The polarizing beamsplitter provides that only radiation plane-polarized in an orientation that is transmitted or reflected thereby can circulate in the resonator. The quarter-wave plate rotates the polarization plane of radiation by 90° degrees in a double-pass therethrough.

In one preferred mode of operation, the gain-element is continuously optically pumped. The polarizing beamsplitter provides a fold-mirror of the resonator. With no potential applied to the Pockels cell, the Pockels cell does not rotate the polarization plane of radiation so any radiation from the gain-element that is reflected by the polarizing beamsplitter will be transmitted out of the resonator by the polarizing beamsplitter after a double-pass through the Pockels cell and the quarter-wave plate. Accordingly, radiation can not circulate in the laser-resonator and the optical pumping builds up a population inversion in the gain-element.

When a laser-radiation pulse is required, a potential is applied to the Pockels cell sufficient to cause the birefringence of the Pockels cell to rotate the polarization-orientation of radiation by 90° in a double-pass therethrough. This can be described as a "quarter-wave state" of the cell. An additional 90° rotation of the polarization orientation is provided by the quarter-wave plate as noted above. Any radiation reflected by the polarizing beamsplitter will be re-reflected by the polarizing beamsplitter after a double-pass through the Pockels cell and the quarter-wave plate. Accordingly, radiation can circulate in the laser-resonator.

The circulation of the radiation in the resonator causes a build up of laser radiation in the laser-resonator. This depletes the population inversion in the gain-element which eventually limits the laser radiation building up in the resonator to some maximum level. At this point, the potential applied to the Pockels cell is switched off, and the laser radiation that has built up in the resonator (cavity) is reflected (dumped) out of the resonator within one round trip time for radiation in the resonator. This is only about a few nanoseconds (ns) for a resonator having a length between about 0.5 meters (m) and 1.0 m. It should be noted that the switching time for the Pockels cell from the no polarization-orientation rotation state to the quarter-wave state and vice-versa is about the round trip-time of the laser-resonator or less, for example a few nanoseconds.

It will be evident from the description provided above that the PRF of a cavity-dumped laser can be varied without varying the pulse-duration, as the pulse duration is determined by the resonator round-trip time. In certain applications, however, for example via-hole drilling, the few nanoseconds pulse duration of a cavity dumped laser is too short. It would be advantageous for these applications to have a cavity dumped laser in which the pulse duration could be made selectively longer, independent of the PRF.

SUMMARY OF THE INVENTION

The present invention is directed to a pulsed-laser having a selectively variable pulse-duration. In one aspect, a laser in accordance with the present invention comprises a laser-resonator terminated by first and second mirrors. The laser-resonator has a longitudinal axis, an optical length and having a round trip-time dependent on the optical length of the laser-resonator. A gain-element is located in the resonator. An arrangement is provided for energizing the gain-element. An optical switch is located in the resonator and arranged to permit circulation of radiation along the longitudinal axis of the resonator in a first state of the switch when the gain-element is energized. The optical switch is arranged to direct radiation out of the resonator at an angle to the longitudinal axis when not in the first state. The optical switch is further arranged to switch progressively from the first state to a second state in a predetermined time longer than the round-trip time of the resonator, such that circulating laser-radiation is directed out of the resonator by the switch as a laser-radiation output pulse having duration corresponding to the switch time and longer than the round-trip time of the resonator.

The duration of the radiation pulse can be selectively varied by selectively varying the predetermined switch time of the optical switch. The pulse duration is preferably greater than about ten nanoseconds.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
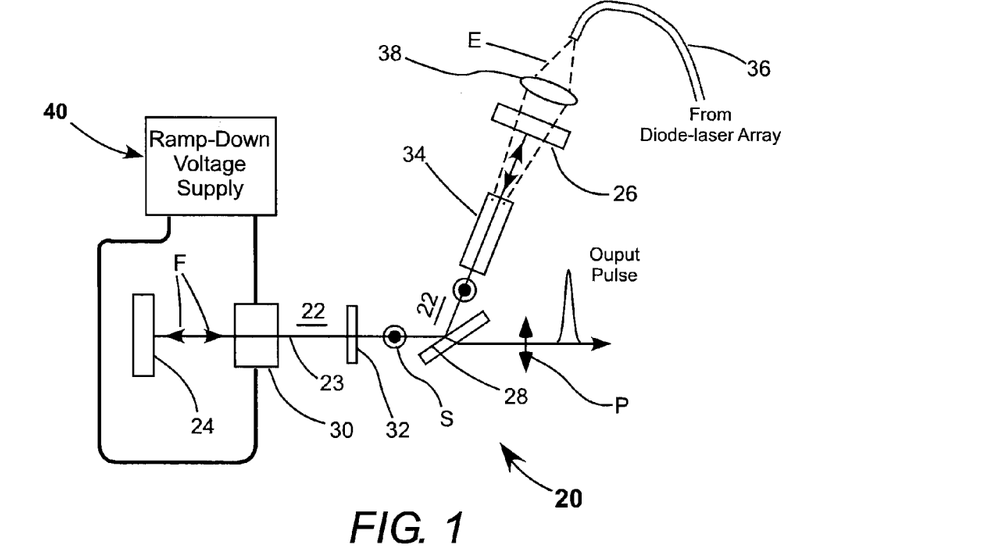
FIG. 1 schematically illustrates one preferred embodiment of a cavity-dumped laser in accordance with the present invention including a laser-resonator folded by a polarizing beam splitter, the polarizing beamsplitter being cooperative with a Pockels cell and a quarter-wave plate to form an optical switch, with the Pockels cell being switched by a rampable voltage supply, and wherein output pulses are dumped from the resonator by transmission through the polarizing beamsplitter.

Referring now to the drawings, wherein like components are designated by like reference numerals, FIG. 1 schematically illustrates a preferred embodiment 20 of a laser in accordance with the present invention. Laser 20 includes a laser-resonator (resonant cavity) 22 terminated by end-mirrors 24 and 26. The resonator has a longitudinal axis 23 that is once-folded by a polarization-selective mirror (polarizing beamsplitter) 28. A gain-element 34 is located on the resonator axis between polarization-selective mirror 28 and end-mirror 26. The gain-element is energized (preferably continuously energized) by optical pump radiation E delivered via an optical fiber 36 from a diode-laser array (not explicitly shown). Mirror 24 and mirror 26 are both highly reflective for radiation having a fundamental wavelength of material of the gain-element as neither mirror is required to be an output coupling mirrors. The reflectivity is preferably as near to 100% as possible.

Mirror 26 is highly transmissive for the wavelength of the pump-radiation. By way of example, a gain-element of neodymium-doped yttrium aluminum garnet (Nd:YAG) has a preferred fundamental wavelength of about 1064 nanometers (nm). Nd:YAG is preferably optically pumped by radiation having a wavelength of about 808 nm or about 855 nm. Pump-radiation is focused into gain-element 34, through mirror 26, by a lens 38.

Located between end-mirror 24 is a quarter-wave plate (at the fundamental wavelength) 32 and a Pockels cell 30. Pockels cell 30 is driven by voltage applied from a voltage supply 40, the switching voltage of which can be "ramped" down from some maximum value, over a time period longer than about the round-trip time for radiation in resonator 22. Preferably the period is greater than about twice a round-trip time of the resonator, and more preferably greater than about eight-times a round-trip time of the resonator.

Polarization-selective mirror 28 is preferably arranged such the resonator axis is incident thereon at an angle of about 56 degrees, i.e., at about the Brewster angle. At this incidence angle, mirror 28 is highly reflective for fundamental-wavelength radiation having a polarization-orientation perpendicular to the plane of incidence of the radiation on the mirror. This referred to by practitioners of the art as s-polarized radiation, the orientation of which is indicated in FIG. 1 by arrowheads S. Mirror 28 is highly transmissive for fundamental-wavelength radiation having a polarization-orientation parallel to the plane of incidence of the radiation on the mirror. This is referred to by practitioners of the art as p-polarized radiation, the orientation of which is indicated in FIG. 1 by arrows P. The p and s polarization-orientation planes are perpendicular to each other.

Pockels cell 30 includes a birefringent material, the birefringence of which is variable dependent on the voltage applied. In a preferred mode of operation the cell is configured such that when zero voltage is applied, the polarization-orientation of fundamental-wavelength radiation making a double-pass (out and back) though the cell is not changed. When one particular high-voltage is applied, the birefringence of the Pockels cell causes the polarization-orientation of fundamental-wavelength radiation making a double-pass though the cell to be rotated by 90°. This referred to herein after as the quarter-wave voltage ($V_{\lambda/4}$). Quarter-wave plate 32 is configured to rotate the polarization-orientation of fundamental wavelength radiation making a double pass therethrough by 90°. This is, of course, fixed.

The Pockels cell 30, quarter-wave plate 32 and polarization-selective mirror 28 form an optical switch. In one state, wherein there is no voltage applied to the Pockels cell, the optical switch directs fundamental wavelength radiation propagating along the resonator axis out of resonator 22 by transmission through mirror 28. This is because any fundamental radiation that is reflected from mirror 28, s-polarized, toward mirror 24 will return to the mirror 28 in a p-polarized state (after twice passing quarter-wave plate 32) and be transmitted by mirror 28. In another state, wherein voltage $V_{\lambda/4}$ is applied to the Pockels cell, s-polarized fundamental radiation that is reflected from mirror 28 toward mirror 24 will return to the mirror 28 still s-polarized and be reflected by mirror 28. In this state of the optical switch, with gain-element 34 energized, the power of fundamental-wavelength radiation in the resonator will build up rapidly as laser-radiation.

When any other voltage between zero and $V_{\lambda/4}$ is applied to the Pockels cell, i.e., in any other state of the optical switch, radiation will be delivered out of the cavity at a rate corresponding to the applied voltage. In a prior-art cavity dumped laser the voltage would be switched from $V_{\lambda/4}$ to zero in a time period about equal to or less than the round-trip time of the resonator, resulting in an output pulse having a duration about equal to the round-trip time of the resonator. In the laser of FIG. 1, voltage supply 40 is arranged to ramp-down the voltage applied to the Pockels cell over a time several times longer than the round trip time of the resonator, with the ramp-down time (fall-time) of the voltage being selectively variable. Selectively varying the ramp-down time provides that output pulse duration of the laser is selectively variable. A detailed description of principles by which these selective variations are effected is provided further hereinbelow. Before proceeding with this detailed description, a description of one alternate form of laser in accordance with the present invention is described, with reference to FIG. 2

Figure 2:
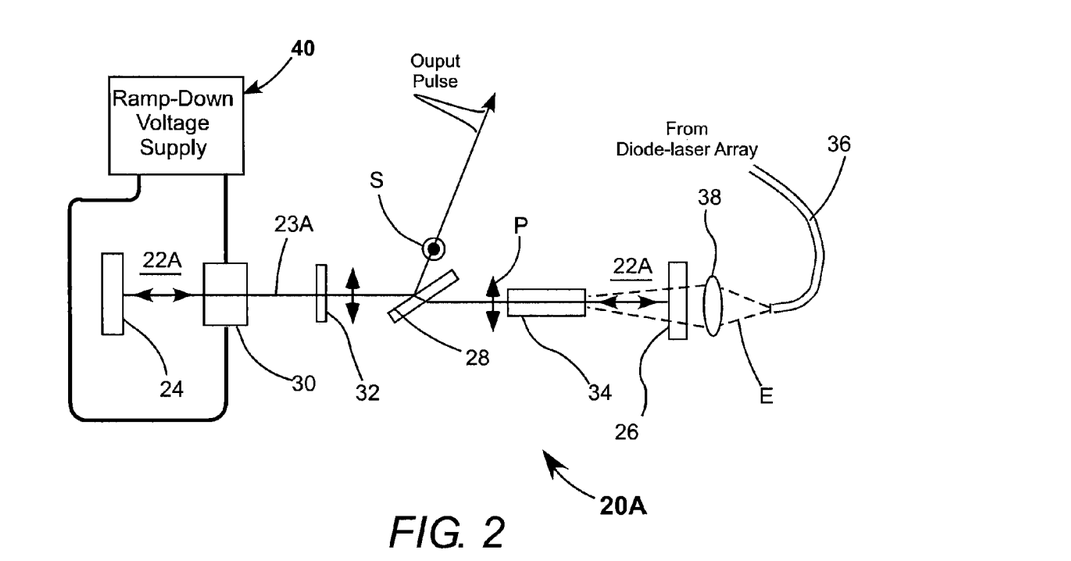
FIG. 2 schematically illustrates another preferred embodiment of a cavity dumped laser in accordance with the present invention including a laser-resonator having a polarizing beam splitter on the resonator axis, the polarizing beamsplitter being cooperative with a Pockels cell and a quarter-wave plate to form an optical switch, with the Pockels cell being switched by a rampable voltage supply, and wherein output pulses are dumped from the resonator by reflection from the polarizing beamsplitter.

Here, another embodiment 20A of a laser in accordance with the present invention includes a resonator 22A that is configured as a straight resonator terminated by mirrors 24 and 26, as above-specified. Polarization selective mirror 28 is positioned on axis 23A of the resonator at Brewster angle incidence. In this configuration, however, the optical switch formed by the Pockels cell, the quarter-wave-plate, and the polarization selective minor, directs radiation out of the resonator by reflection from the polarization-selective minor. The function of ramp-down power supply 40 is the same in laser 20A as in laser 20.

Figure 3:
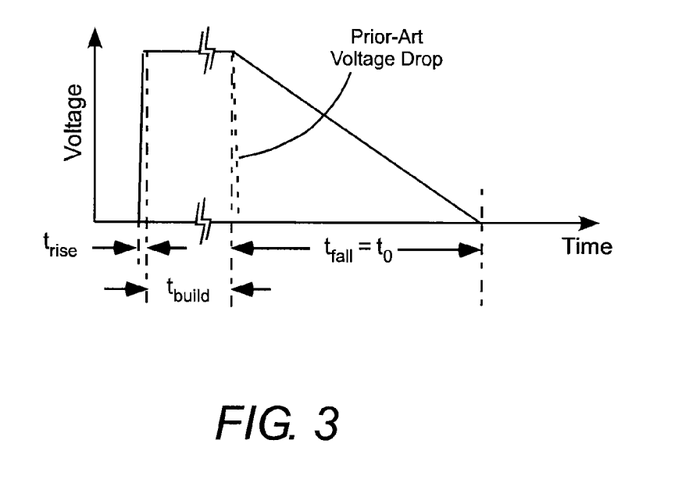
FIG. 3 is graph schematically illustrating one example of voltage as a function of time (voltage cycle) provided by the voltage supply of FIG. 1 for switching the Pockels cell in the laser of FIG. 1.

FIG. 3 is graph schematically illustrating one example of voltage as a function of time provided by the voltage supply 40 of FIG. 1 for switching the Pockels cell in the laser of FIG. 1. The voltage rises from zero to $V_{\lambda/4}$ in a time which may be a few nanoseconds or less. The voltage remains at $V_{\lambda/4}$ for a time $t_{build}$ during which circulating power in the resonator builds to a maximum. The voltage then drops to zero, in this example linearly, in a time $t_{fall}$ which is alternatively designated $t_0$ in a mathematical analysis presented below.

The rate equations for the involving inverted population (n) (numbers of stimulated excited laser ions) and the photons ($\phi$) are:

$$\frac{d\phi}{dT} = \left[(n-1) + \frac{\ln R}{L}\right]\phi. \quad (1)$$

$$\frac{dn}{dT} = R_p - n\phi \quad (2)$$

Where n is the number of excited state ions in the gain-element, $\phi$ is the number of photons circulating in the resonator, and $R_p$ is the pumping rate of the gain-element. Here n and $\phi$ and the pump rate $R_p$ rate are all normalized to the threshold inverted population of the gain-element and T is time normalized to a so-called photon decay time $\tau_c = t_r/L$, where $t_r$ the round-trip time and L the round-trip accumulated dissipative loss in the resonator. R is the effective reflectivity of the combination of Pockels cell 30, quarter-wave plate 32, the polarization-selective mirror, i.e., the effective reflectivity of the optical switch formed by these components. Here, it is required that the effective reflectivity does not drop to zero suddenly from about 100% to zero as in a prior art cavity-dumped laser, but in a finite amount of time $t_0$, significantly longer than the round-trip time $t_r$ of the resonator. The terminology "about 100%" recognizes that in practice mirrors can never be optically coated to have exactly 100% reflectivity, however, reflectivity greater than 99.9% is achievable by most commercial suppliers of optical coatings.

One way to achieve a progressive effective reflectivity drop is to drop the applied voltage to the Pockels cell linearly, from $V_{\lambda/4}$ to zero as depicted in the graph of FIG. 3. This can be represented by an equation:

$$V(t) = V_{\lambda/4}(1 - t/t_0). \quad (3)$$

Installing this voltage in the reflectivity expression $$R = \sin^2\left[\frac{\pi}{2} \frac{V(t)}{V_{\lambda/4}}\right]$$

of equation (1), the evolution of n and $\phi$ within the dumping period $(0, t_0)$ can be found by solving equation (1) either analytically or numerically. The photon output rate (the peak power) is simply $$P_{peak} = -\left(\frac{d\phi}{dt}\right)_{output} = -\frac{\ln R}{L}\phi. \quad (4)$$

Figure 4:
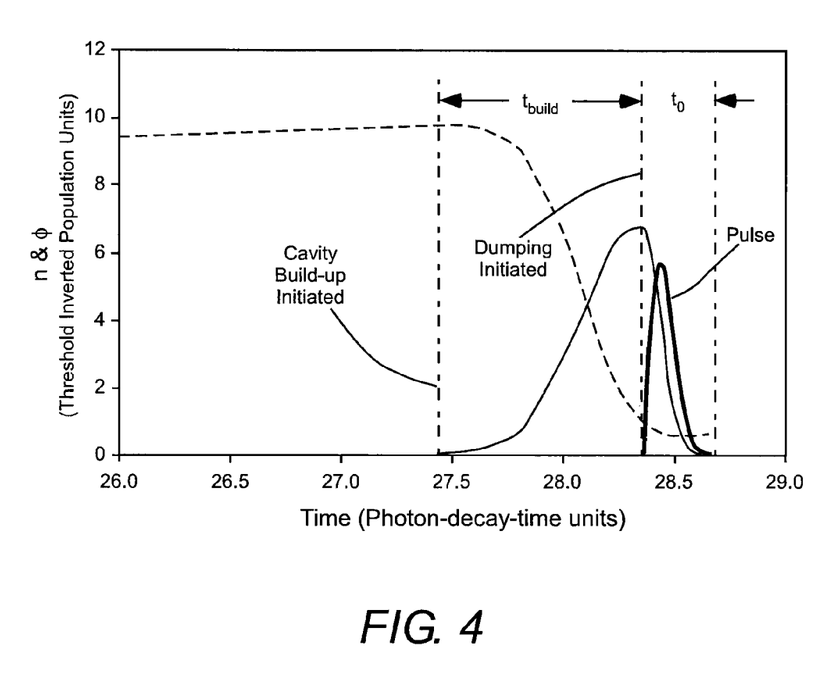
FIG. 4 is a graph schematically illustrating one example of calculated inverted population in the gain-element of FIG. 1, circulating photon level in the resonator of FIG. 1, and an output pulse from the optical switch of FIG. 1 as a function of time, when the Pockels cell is driven by a voltage cycle similar to that of FIG. 3.

FIG. 4 is a graph schematically illustrating one example of calculated inverted population in the gain-element of FIG. 1 (dashed-line), circulating photon level in the resonator of FIG. 1 (thin solid line), and an output pulse from the optical switch of FIG. 1 (bold solid line) as a function of time, when the Pockels cell is driven by a voltage similar to that of FIG. 3, with a fall time or dumping period $(0, t_0)$ of 50 ns, which is about fifteen-times the assumed resonator round-trip time. The output pulse has a FWHM duration of 20.8 ns, i.e., about one-half of the 50-nsec dump period. Note than in FIG. 4 the inverted population of the gain-element (dashed line) is assumed to have been building over a period of a few microseconds (µs).

Figure 5:
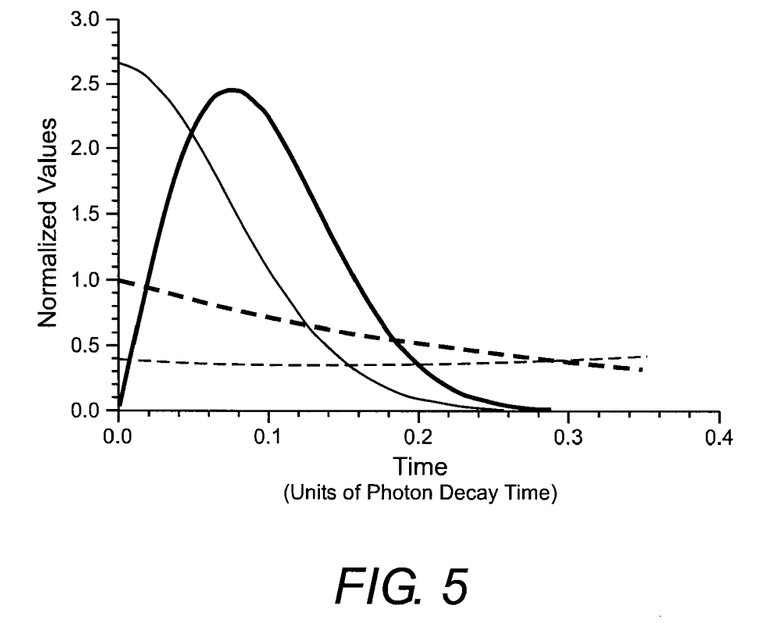
FIG. 5 is a graph schematically illustrating one example of calculated inverted population in the gain-element of FIG. 1, circulating photon level in the resonator of FIG. 1, and effective reflectivity of the Pockels cell, quarter-wave plate and beamsplitter, and an output pulse from the optical switch of FIG. 1 as a function of time, when the Pockels cell is driven by a voltage cycle similar to that of FIG. 3.

FIG. 5 is a graph schematically depicting further detail of calculated inverted population in the gain-element of FIG. 1

(thin dashed-line), circulating photon level in the resonator of FIG. 1 (thin solid line), and an output pulse from the optical switch of FIG. 1 (bold solid line) as a function of time, when the Pockels cell is driven by a linearly-falling voltage. The linear falling voltage results in an effective reflectivity falling as designated in FIG. 5 by a bold dashed line. A detailed discussion of the influence on the voltage fall function on the temporal shape of output pulses is presented further hereinbelow.

The initiation of the cavity-dumping in accordance with the present invention is always near the threshold value of the inverted population, and accordingly φ is near maximum when cavity-dumping is initiated. This means that pulse formation is independent of the PRF at which the laser is operated, or the laser gain. It will be evident to one skilled in the art that the output-pulse duration depends mostly on dump-time, or more specifically, depends on dump time, resonator length and the round-trip accumulated dissipative loss. This is because time in equation (1) is normalized to the photon-decay time.

Figure 6:
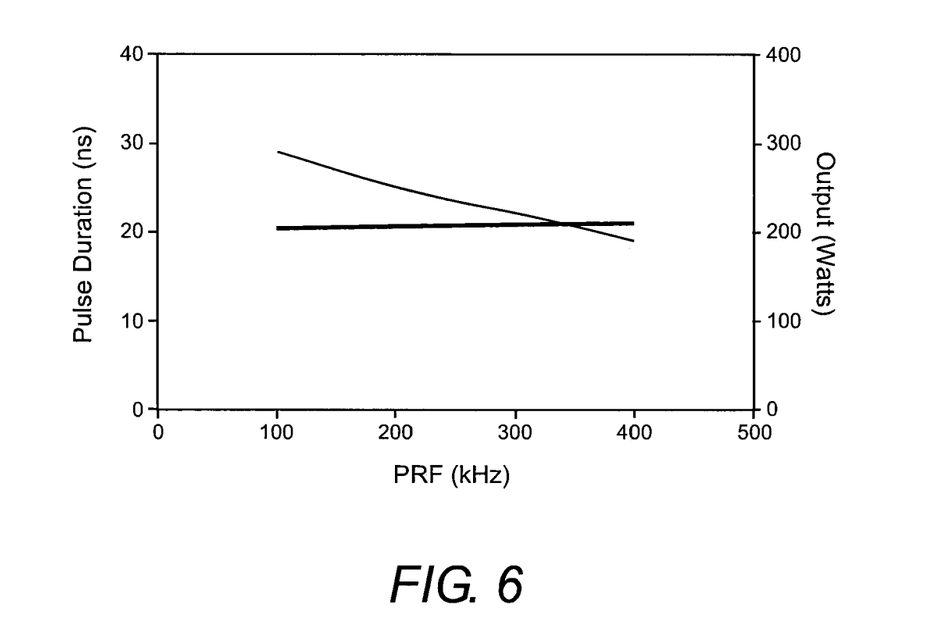
FIG. 6 is a graph schematically illustrating calculated pulse-duration and average output-power as a function of pulse-repetition frequency (PRF) in an example of the laser of FIG. 1.

FIG. 6 is a graph schematically illustrating calculated pulse-duration (bold solid line) and average output power (thin solid line) as a function of pulse-repetition frequency (PRF) in an example of the laser of FIG. 1. It can be seen that the pulse duration is indeed almost constant over a PRF range between about 100 kilohertz (kHz) and 400 kHz, which is a preferred operating PRF range for the laser.

In a cavity-dumped solid-state laser in accordance with the present invention, in which cavity dumping occurs over a period much longer than a resonator round trip time, not only is the pulse-duration selectively variable, but also the temporal pulse shape is selectively variable. Those skilled in the art will recognize that in prior-art cavity dumped lasers wherein cavity dumping occurs in a time about equal to or less than the round-trip time, the pulse duration and the pulse shape is not sensitive to a specific voltage-drop function.

In order to achieve control of the output pulse width, the effective reflectivity of the optical switch, i.e., the effective reflectivity of the polarizing beamsplitter, must be reduced that from 100% at t=0 to 0% at t=$t_0$, in such a way that the decay time of the resonator appears in the following form:

$$\frac{1}{\tau} = \frac{1}{\tau_c}\left[1 + \left(\frac{\tau_c}{t_r} - 1\right)\frac{t}{t_0}\right]. \quad (5)$$

Accordingly, the coupled equations (1) and (2) for the inverted population and the photon number inside the cavity can be written as $$\frac{d\phi}{dT} = (n-1)\phi - \left(\frac{\tau_c}{t_r} - 1\right)\frac{T}{T_0}\phi. \quad (6)$$

$$\frac{dn}{dT} = R_p - n\phi \quad (7)$$

A corresponding effective reflectivity function of time for the optical switch can have an exponential form.

$$R(t) = \exp[-(1 - t_r/\tau_c)t/t_0]. \quad (8)$$

Figure 7:
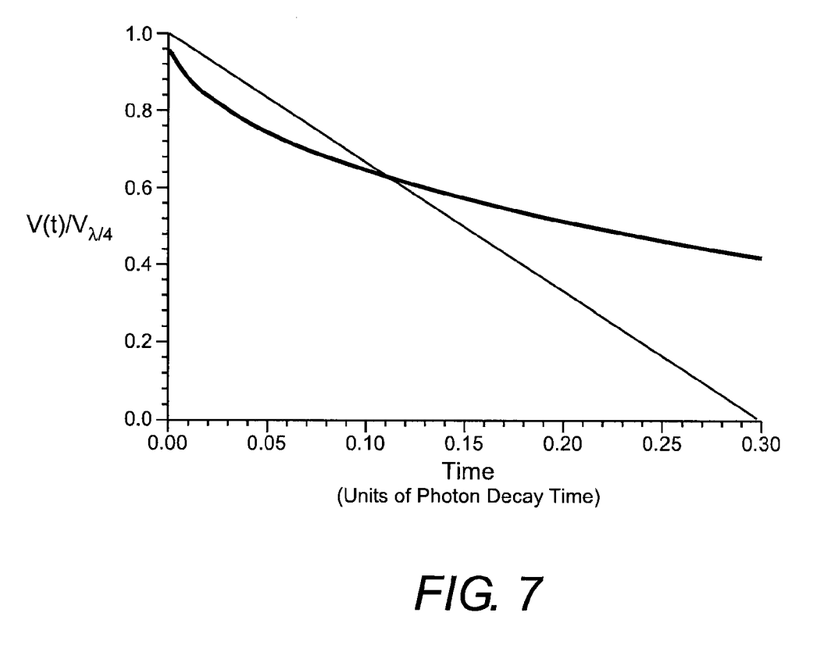
FIG. 7 is a graph schematically illustrating two examples, one linear and one exponential, of calculated normalized voltage as a function of time in the falling edge of a driving-voltage cycle applied to the Pockels cell in an example of the laser of FIG. 1.

FIG. 7 is a graph schematically illustrating two examples, one linear (thin solid line) and one exponential (bold solid line), of normalized voltage as a function of time in the falling edge of a driving-voltage cycle applied to the Pockels cell in an example of the laser of FIG. 1. A relatively fast dumping-period of about eight round trip times is assumed ($t_0$=50 nsec=0.3 $\tau_c$). The linear function is according to equation (3), and the exponential function is according to equation (8).

Figure 8:
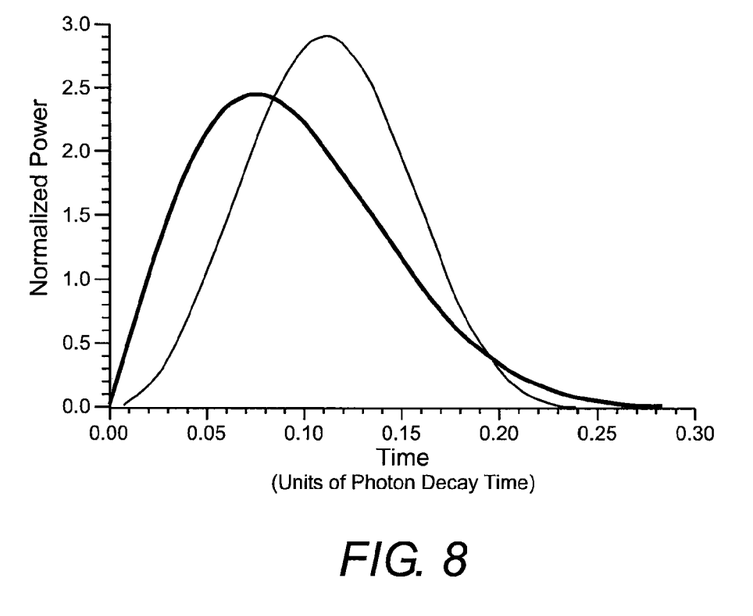
FIG. 8 is a graph schematically illustrating calculated normalized output-pulse pulse power as a function of time produced by the linear and exponential falling edges of FIG. 7.

FIG. 8 is a graph schematically illustrating normalized output-pulse pulse power as a function of time produced by the linear and exponential voltage functions of FIG. 7. The pulses produced by the linear and exponential voltage functions are indicated by a thin solid line and a thick solid line, respectively. The exponential voltage function reduces reflectivity faster in the first half portion of the dumping-period, than does the linear function. This causes the leading edge of the pulse formed by the exponential function to be sharper that that formed by the linear voltage function. The pulse duration in both cases, however, is about the same.

Figure 9:
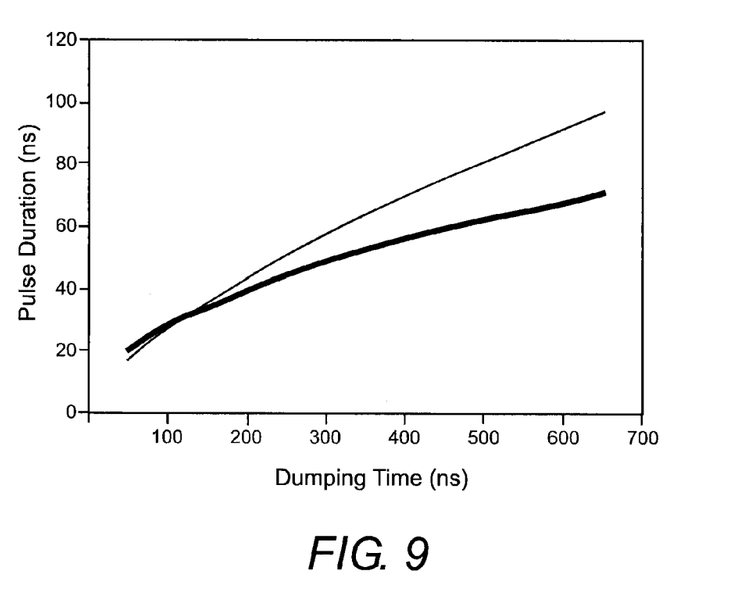
FIG. 9 is a graph schematically illustrating calculated output pulse duration as a function of dumping (voltage-fall) time in an example of the laser of FIG. 1 for the linear and exponential voltage fall-time profiles of FIG. 7.

FIG. 9 is a graph schematically illustrating output pulse duration as a function of dumping (voltage-fall) time in an example of the laser of FIG. 1 for the linear and exponential fall-time profiles (voltage functions) of FIG. 7. Pulse durations are greater than about 10 ns and range between about 10 ns and about 100 ns. It can be seen as the dumping time is increased the temporal profile of the voltage fall has an increasing effect on the output-pulse parameters. In this case, a faster drop in the early stage of dumping with an exponential voltage function tends to generate shorter pulses than the linear voltage function.

It should be noted here that in all of the calculations discussed above it was assumed the gain-element was a Nd:YAG gain-element optically pumped by 500 W of 808 nm-radiation delivered into a 2.0 millimeter (mm) spot. The resonator length was assumed to be 50.0 centimeters (cm)

Figure 10:
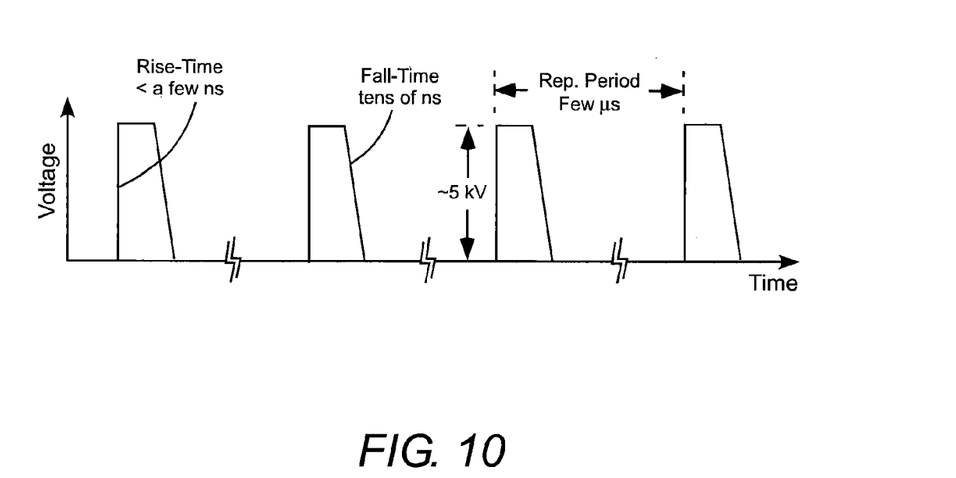
FIG. 10 is a graph schematically illustrating voltage as a function of time for three voltage cycles similar to the voltage cycle of FIG. 3 periodically spaced.

Before proceeding with a description of one embodiment of a voltage supply that can drive Pockels cell 30 with a protracted voltage fall as described above, it is useful to recapitulate what is expected of the voltage supply, with reference, here, to FIG. 10. The voltage supply must deliver voltage cycles periodically, with the period between cycles being the inverse of the PRF required. The period between cycles is on the order of a few microseconds. Each voltage cycle has a rise-time of a few nanoseconds or less to a quarter-wave voltage ($V_{\lambda/4}$) which is typically on the order of 5.0 kilovolts (kV). The voltage fall-time is protracted over a period of about 50.0 ns or longer. The voltage fall function can be a linear function as depicted in FIG. 10, or some other function such as an exponential function as discussed above.

The design of high voltage switches suitable for use in the ramp-down voltage supply is well known to those skilled in the electronic arts and a detailed description of such design is not necessary for understanding principles of the present invention. A brief description of one preferred arrangement of the ramp-down voltage supply 40 is set forth below with reference to FIG. 11, which is a block diagram schematically and symbolically illustrating the arrangement.

Figure 11:
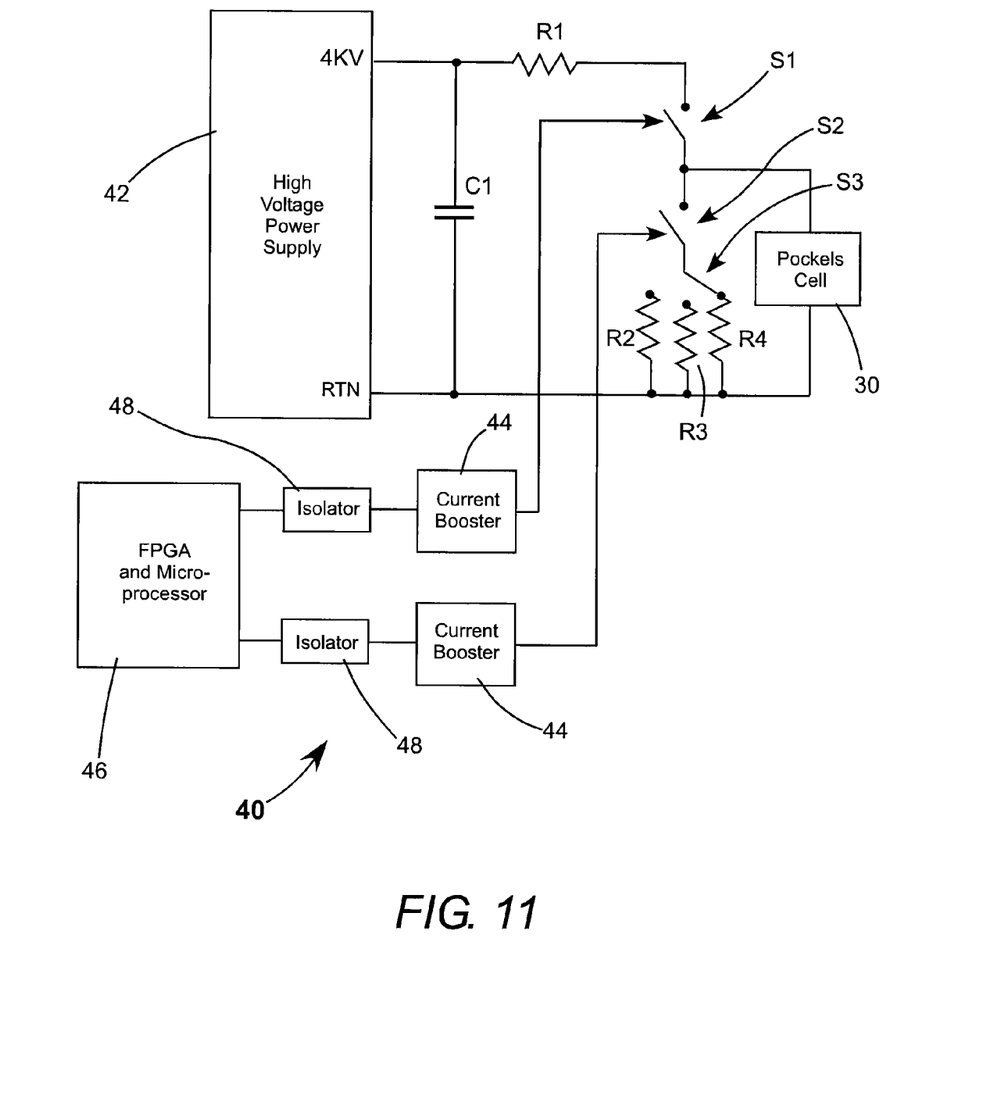
FIG. 11 is an electronic block diagram schematically illustrating a preferred arrangement of the ramp voltage supply in the laser of FIG. 1.

Here, the ramp-down supply includes a high voltage power supply 42 connected to Pockels cell 30 via a resistor R1 and a switch S1. One suitable power supply is a "C-series" supply available from UltraVolt, Inc., of Ronkonkoma, N.Y. The high voltage side of the Pockels cell is connected to the return (RTN) or isolated ground of the power supply via a switch S2 and one of a plurality of resistors select by a switch S3. The Pockels cell can be regarded as a capacitor. When switches S1 and S2 are open, no voltage is applied to the Pockels cell. When switch S1 is closed, with S2 still open, the Pockels cell is charged to the high voltage of the power supply, here, 4.0 kilovolts (kV). At a predetermined time after the Pockels cell is charged, S1 is opened and switch S2 is closed. The Pockels cell voltage then falls to zero in a time determined by the magnitude of the resistance of R2, R3, or R4, each of which has a different value for selecting a different fall time. Clearly, more resistors having different resistance values can be provided to provide a bigger range of selectable fall times.

Switches S1 and S2 are shown symbolically as conventional switches for convenience of illustration, these switches in practice, however, are preferably high-voltage MOSFETs. In practice each switch may require a plurality of MOSFETs in series, as commercially available MOSFETS are presently limited to switching about 1.0 kV or less.

Gates of the switches are operated by current boosters 44, which provide a high current to the MOSFET gates. This is needed to overcome input capacitance of the gates and provide a fast turn-on (closing) of the switches. Control of the rise time is provided by resistor R1 and capacitor C1. The operation of the current boosters is effected by field-programmable (logic) gate array (FPGA) and microprocessor circuitry 46. This simply determined the rate at which switches S1 and S2 are operated for determining pulse repetition frequency and the time difference between opening S1 and closing S2 for controlling energizing of the gain-element. Isolators 48 are provided between current boosters 44 and circuitry 46. This is to isolate the circuitry which operates at relatively low voltages from the high voltage switches.

In the arrangement described above, the voltage fall as a function of time will be approximately linear. This, however, should not be construed as limiting the present invention. A ramp-down voltage supply could provide some other voltage fall function, such as the exponential function discussed above. One way of providing this in an arrangement similar to that described above with reference to FIG. 11 would be to form switch S2 from a series of MOSFETS each having a resistor in parallel therewith the resistors connected together in series. The MOSFETS could be switched sequentially beginning from the Pockels cell with the switching intervals and the resistor values selected to provide a stepwise approximation to a desired voltage fall function. This or any other method for providing a desired fall function could be implemented by one skilled in the electronic arts without departing from the spirit and scope of the present invention.

In summary, an inventive cavity-dumped, repetitively-pulsed, solid-sate laser is described above. In the inventive laser cavity dumping is protracted over a predetermined time much longer than a round-trip time of the resonator of the laser. The dumping is controlled in a way that can influence the temporal shape in addition to the FWHM duration of pulses provided by the laser, independent of the pulse repetition frequency. The present invention is described in terms of a preferred and other embodiments. The invention is not limited, however, to the embodiments described and depicted. Rather, the invention is limited only by the claims appended hereto.

What is claimed is:

1. A method of generating pulses from a cavity dumped laser of the type having a gain medium and a controllable element for selectively rotating the polarization state of the radiation circulating in the cavity from a first state wherein a majority of the radiation is permitted to circulate in the resonant cavity and a second state wherein the majority of the circulating radiation is dumped from the resonant cavity via a polarizing element to create an output pulse, said method comprising the steps of:
   operating the element in the first state for a first time period allowing the level of intracavity radiation to increase; and
   switching the element from the first state to the second state in order to generate an output pulse, wherein the switching period between the first and the second state is at least twice as long as the round trip time in the cavity.

2. A method as recited in claim 1, wherein the switching period between the first and the second state is at least four times as long as the round trip time in the cavity.

3. A method as recited in claim 1, wherein the length of the switching period is selected based upon a desired pulse duration.

4. A method as recited claim 1, further including the step of switching the element from the second state back to the first state.

5. A method as recited in claim 4, wherein the time period for switching the element from the second state back to the first state is less than the round trip time of the resonator.

6. An improved cavity dumped laser of the type having a gain medium and a controllable element for selectively rotating the polarization state of the radiation circulating in the cavity from a first state wherein a majority of the radiation is permitted to circulate in the resonant cavity allowing the level of intracavity radiation to increase and a second state wherein the majority of the circulating radiation is dumped from the resonant cavity via a polarizing element to create an output pulse, said improvement comprising:
   a controller for variably controlling the time in which the element switches from the first state to the second state in order to achieve a predetermined pulse duration and wherein the switching period between the first and the second state is at least twice as long as the round trip time in the cavity.

7. A laser as recited in claim 6, wherein said controller also functions to variably control the rate at which the element switches from the first state to the second state in order to achieve a predetermined pulse shape.

8. A laser as recited in claim 6, wherein the switching period between the first and the second state is at least four times as long as the round trip time in the cavity.

9. A laser as recited claim 6, wherein the controller further operates to cause the element to switch from the second state back to the first state.

10. A method as recited in claim 9, wherein the time period for switching the element from the second state back to the first state is less than the round trip time of the resonator.

11. A method of generating pulses from a cavity dumped laser of the type having a gain medium and a controllable element for selectively rotating the polarization state of the radiation circulating in the cavity from a first state wherein a majority of the radiation is permitted to circulate in the resonant cavity and a second state wherein the majority of the circulating radiation is dumped from the resonant cavity via a polarizing element to create an output pulse, said method comprising the steps of:
   (a) operating the element in the first state for a first time period allowing the level of intracavity radiation to increase;
   (b) switching the element from the first state to the second state in order to generate an output pulse, wherein the switching period between the first and the second state is at least twice as long as the round trip time in the cavity;
   (c) switching the element from the second state back to the first state; and
   (d) repeating steps (a), (b) and (c) a plurality of times in order to generate a plurality of cavity dumped output pulses.

12. A method as recited in claim 11, wherein the switching period between the first and the second state is at least four times as long as the round trip time in the cavity.

13. A method as recited in claim 11, wherein the length of the switching period is selected based upon a desired pulse duration.

14. A method as recited in claim 11, wherein the time period for switching the element from the second state back to the first state is less than the round trip time of the resonator.

* * * * *